(12) United States Patent
Dellenger (10) Patent No.: US 7,379,052 B1
(45) Date of Patent: *May 27, 2008

(54) HAND-HELD COMPUTER CONTROL DEVICE

(76) Inventor: Terry L. Dellenger, 909 Hampton Trail, Lilburn, GA (US) 30047

( * ) Notice: Subject to any disclaimer, the term of this patent is extended or adjusted under 35 U.S.C. 154(b) by 612 days.

This patent is subject to a terminal disclaimer.

(21) Appl. No.: 10/954,071

(22) Filed: Sep. 29, 2004

Related U.S. Application Data (63) Continuation-in-part of application No. 09/986,591, filed on Nov. 9, 2001, now Pat. No. 6,816,151.

(51) Int. Cl.
*G09G 5/08* (2006.01)

(52) U.S. Cl. ...................... 345/167; 345/169

(58) Field of Classification Search ......... 345/156–169
See application file for complete search history.

(56) References Cited

U.S. PATENT DOCUMENTS

| | | | | |
|---|---|---|---|---|
| 5,267,181 A * | 11/1993 | George | ................ | 708/142 |
| 5,296,871 A * | 3/1994 | Paley | ................ | 345/163 |
| 5,506,605 A * | 4/1996 | Paley | ................ | 345/163 |
| 5,512,892 A * | 4/1996 | Corballis et al. | ........... | 341/22 |
| 5,668,574 A * | 9/1997 | Jarlance-Huang | ........... | 345/158 |
| 5,724,106 A * | 3/1998 | Autry et al. | ................ | 348/734 |
| 5,760,766 A * | 6/1998 | Auber et al. | ................ | 345/167 |
| 5,805,256 A * | 9/1998 | Miller | ................ | 348/734 |
| 5,894,303 A * | 4/1999 | Barr | ................ | 345/163 |
| 5,982,356 A * | 11/1999 | Akiyama | ................ | 345/161 |
| D430,161 S * | 8/2000 | Hovsepian | ................ | D14/405 |
| 6,184,862 B1 * | 2/2001 | Leiper | ................ | 345/156 |
| 6,429,854 B1 * | 8/2002 | McKown | ................ | 345/168 |
| D464,053 S * | 10/2002 | Zicolello | ................ | D14/409 |
| 6,680,728 B1 * | 1/2004 | Lilenfeld | ................ | 345/156 |
| 2001/0035856 A1 * | 11/2001 | Myers | ................ | 345/156 |

* cited by examiner

*Primary Examiner*—Richard Hjerpe
*Assistant Examiner*—Jean Lesperance
(74) *Attorney, Agent, or Firm*—Maxine Barasch & Associates, PLLC; David L. Banner (57) ABSTRACT

A hand-held control device which fits interchangeably into a user's right or left hand. An ergonomically correct housing allows the device to fit snuggly into the grasp of the users hand and be used without creating user fatigue. The operative element in the control device may be a trackball, joystick, touch pad, or other device that can be manipulated by the user's thumb and, in conjunction with one or more switches actuated by phalangeal regions of the fingers, provides functional equivalence to a standard computer mouse or trackball. An optional band or strap may be provided to secure the control device to the user's hand such that the fingers of the hand are available for other tasks without setting the control device down. The control device may communicate with a computer or similar apparatus by a wired cable or a wireless interconnection, typically an RF or IR connection.

19 Claims, 8 Drawing Sheets

HAND-HELD COMPUTER CONTROL DEVICE

RELATED APPLICATIONS

This application is a continuation-in-part of my U.S. patent application Ser. No. 09/986,591 filed Nov. 9, 2001 now U.S. Pat. No. 6,816,151.

FIELD OF THE INVENTION

The present invention relates to remote control devices and, more particularly, to a palm size, symmetrical, hand-held, control device adapted for easy, interchangeable retention in the grasp of and adjacent the palm of a user's right or left hand.

BACKGROUND OF THE INVENTION

Computers and other similar systems have now invaded virtually every area of human endeavor, most being equipped with a Graphic User Interface (GUI). GUI assumes that the user thereof is equipped with what is generically referred to as a remote control device. Pointing devices are a form of remote control device and are used, among many other uses, to move a cursor around on a computer screen. In addition to providing a cursor movement function, pointing devices are typically equipped with one or more switches, buttons or similar devices that allow signals to be sent to a processor for interpretation into a command or commands for positioning a computer cursor or other computer controlled functions.

The earliest and probably still the most widely used pointing device is the ubiquitous "mouse". A mouse typically has a contoured housing that rests under the palm and fingers of the user's hand having a flat bottom surface equipped with a ball, a light or other mechanism which moves or interprets movement on a flat surface. A mechanism inside the mouse generates signals corresponding to the movement of the mouse in both the X and Y directions on the flat surface. It has been established by the medical research that the extended use of a mouse may lead to or aggravate carpel tunnel syndrome (CTS). The movement of such a mouse of the prior art requires a great deal of arm and hand motion, typically from the user's shoulder outward. This precludes the use of such a device by a person having a variety of physical disabilities where there is restricted movement of the arm, hand and fingers.

Another widely used class of pointing devices is called a trackball device. In operation, a trackball may be envisioned as an inverted mouse where the ball resides on the top surface of the device rather than on the bottom surface. A user directly manipulates the ball typically with finger, hand and wrist action to generate X and Y control signals similar to those generated by a mouse. Track ball devices typically require relatively less movement than do mice. And, because they do not rely on a flat surface nor do they require a surface area for movement for operation, track balls may be placed in a possibly more convenient location relative to their users. Trackball devices still require that users move their arm, hand and fingers repeatedly, although in a more fixed position than with a standard mouse. Even the reduced movement required to use a trackball may possibly, with constant repetition, cause or contribute to CTS. A track ball also restricts its user to the given area where the track ball sits or resides.

It would appear desirable to provide a control device which did not require that a user maintain a constant, fixed physical relationship to the fixed surface upon which the pointing device is manipulated or required to reside. The control device of the present invention allows the user substantially unrestricted flexibility in positioning himself or herself relative to the device being controlled.

DISCUSSION OF THE RELATED ART

U.S. Pat. No. 5,296,871 for THREE-DIMENSIONAL MOUSE WITH TACTILE FEEDBACK, issued Mar. 22, 1994 to W. Bradford Paley, teaches one implementation of a hand-held pointing device. PALEY teaches the use of deformable means acting as sensors to generate signals representatives of movement along not only in the X and Y axes but in the Z axis as well. There is no teaching of a trackball or similar device.

In contradistinction, the hand-held control device of the present invention provides a small trackball or other similar actuating device packaged in an ergonomically correct housing having a shape designed to rest comfortable within a cavity formed naturally as a user moves his or her fingers from an extended position into a clenched fist position. There are no deformable means necessary to sense pointing device motions. Rather, the necessary signals are generated by the trackball or other similar actuating itself. The control device of the invention is easily retained in an operative position a user's right or left hand by a single encircling finger or by thumb pressure against the device thereby allowing use of the finger tips for other activities without need to set the control device down. In alternate embodiments, an optional strap is provided to keep the inventive control device positioned in a user's hand without contact from any of the fingers or thumb of the hand in which the device is being retained. This would allow all the fingers and thumb of the user's hand to be free for use in other operations while the control device remains held by the strap in the palm of the hand.

U.S. Pat. No. 5,512,892 for HAND HELD CONTROL DEVICE, issued Apr. 30, 1996 to Liam P. Corballis, et al., teaches a controller having a number of switch type actuators. A pointing stick is also included but no trackball or similar actuating mechanism is present.

The inventive control device, on the other hand, features a small, ergonomically correct, "pistol grip" shaped hand-held control device which fits interchangeably into either the right or left hand of a user. The inventive control device is easily maintained in an operative position within the user's hand while freeing the distal ends of the user's fingers for task unrelated to operation of the control device.

U.S. Pat. No. 5,668,574 for PALM-TOP WIRELESS TRACKBALL, issued Sep. 16, 1997 to Jarlance-Haung teaches a trackball type pointing device having a substantially rectangular cross section with a trackball element disposed on an upper surface thereof. A switch is disposed adjacent the trackball element for actuation by a user's thumb. At least one additional switch is located on a rear surface of the housing for actuation by the tip of a user's finger. The JARLANCE-HAUNG apparatus differs significantly from the control device of the invention in that the housing is not adapted for comfortable retention within a cavity formed by a user closing his or her fingers around the device. Neither is the JARLANCE-HAUNG device easily retained within the hand because the user's thumb must do double duty and actuate both the trackball element and the switch mounted adjacent thereto. The JARLANCE- HAUNG is not completely symmetrical making it difficult to comfortably, interchangeably use the device in either a right or left hand of a user.

U.S. Pat. No. 5,724,106 for HAND HELD REMOTE CONTROL DEVICE WITH TRIGGER BUTTON, issued Mar. 3, 1998 to Sidney David Autry, et al., discloses a flat remote control device in a similar form factor to a "TV" remote control. A trackball is located in a central region of the upper surface of the device. There is no teaching of a package having an ergonomically correct shape to be grasped and easily retained within a clenched hand of a user. Neither is there any provision for an optional band or other attachment means for securing the trackball unit to a user's hand.

U.S. Pat. No. 6,184,862 for APPARATUS FOR AUDIO DICTATION AND NAVIGATION OF ELECTRONIC IMAGES AND DOCUMENT, issued Feb. 6, 2001, to Thomas Leiper discloses a hand-gripped remote control. The primary function of the LEIPER apparatus is to scan through a series of MRI or similar diagnostic images while dictating notes regarding the images. No trackball or similar pointing device, per se, is provided.

The inventive apparatus, on the other hand, provides an easily gripped control device and features no other ancillary controls (e.g., controls for a dictating machine). The inventive device does allow incorporation of the traditional "clicker" button switches generally found on a mouse.

Published U.S. patent application No. 2001/0035856, for PALM-HELD COMPUTER POINTING DEVICE, SERIAL No. 09/850,437, filed May 7, 2001 by Christopher S. Myers, teaches a palm-help computer pointing device. The mouse buttons are disposed on the side of the housing, adapted for activation by the tips of a user's fingers.

In contradistinction, the mouse buttons on the inventive control device are located centrally on a forward region of the housing. This provides two distinct advantages over the MYERS device. First, the inventive control device of the present invention is symmetrical with the mouse buttons located along an edge, thereby allowing use by either a right-handed or left-handed person. MYERS would need to provide two different devices, the second being a mirror image of the first, to accommodate both right-handed and left-handed users. The second major difference between the MYERS device and the device of the present invention is that the mouse buttons of the inventive control device, because of their position along the edge seam of the device, are activated by a phalangeal region of a user's finger, not by the user's finger tips. This makes actuation much more convenient, especially while the tips of the user's fingers are involved in two-handed typing or another similar activity. To active the mouse buttons of the MYERS device, the user's finger tips must be removed from the keyboard and repositioned over the mouse buttons.

None of these patents or the published application, singly or in any combination, is seen to either teach or suggest the hand-held control device of the invention.

It is therefore an object of the invention to provide a hand-held control device which fits comfortably in a cavity of a user's hand formed by the natural movement of the user's fingers as in a grasping or clenching movement.

It is another object of the invention to provide a hand-held trackball control device which is symmetrical and may be used comfortably and interchangeably in either the left or right hand of a user.

It is another object of the invention to provide a hand-held control device which is easily retained in either the left or right hand of a user while freeing distal portions of a user's fingers for other tasks such as typing without relinquishing contact with the control device.

It is also an object of the invention to provide a hand-held control device which incorporates one or more switches corresponding to the buttons found on a classic mouse-type pointing device.

It is still further object of the invention to provide a hand-held control device which in an alternate embodiment, has no switches.

It is another object of the invention to provide a hand-held control device wherein a switch or switches are actuated by a first, second, or third phalangeal region of a user's fingers.

It is an additional object of the invention to provide a hand-held control device which optionally incorporates a scrolling device.

It is a further object of the invention to provide a hand-held control device which may optionally be fastened by a strap or band to a user's hand for long term operation so that the hand or the fingers thereon may be used for other tasks without disengaging the control device.

It is an additional object of the invention to provide a hand-held control device which may be connected to a computer or other device using a wire or cable.

It is a still further object of the invention to provide a hand-held control device system which may have a wireless interconnection between the control device and a computer or similar device.

It is another object of the invention to provide a hand-held control device wherein the wireless interconnection is a radio frequency (RF) interconnection.

It is a still further object of the invention to provide a hand-held control device wherein the wireless interconnection is an infrared (IR) interconnection.

t is yet another object of the invention to provide a hand-held control device wherein the communication method of transferring the signal from the control device to the receiving device has yet to be discovered but could be incorporated into the present invention.

SUMMARY OF THE INVENTION

The present invention features a hand-held control device which fits snugly adjacent the palm of a user's hand in a cavity formed by the natural movement of a user's fingers from an open, extended position to a closed, encircling (i.e., clenched) position. Because the housing is completely symmetrical around its longitudinal axis, it is readily adaptable for use in either the right or left hand of a user. Because of its diameter, length, and weight, the control device of the present invention is easily supported and retained in a user's hand by as few as one encircling finger. A track ball or other actuating device is diametrically opposed to one or more switches, the trackball or other actuating device being disposed for actuation by the user's thumb. Each of the one or more switches may be selectively actuated by the one of the three phalangeal regions of respective, encircling fingers of the user's right or left hand. The actuating device (e.g., trackball) in conjunction with the one or more switches provides full functional compatibility with a traditional mouse or other similar pointing or control devices. The control device's case shape is a pistol grip style designed to be ergonomically correct so that the device may be used for extended periods of time without user fatigue. A band or strap may optionally be provided to secure the control device in the user's hand such that all the fingers of the hand are completely available for other tasks without needing to set the control device down. The control device of the invention may be attached to a computer or similar apparatus by a direct connect cable or through a wireless interconnection, typically an RF or IR connection. However, another technology either discovered or yet to be discovered may be used as appropriate to the operation of the current invention.

BRIEF DESCRIPTION OF THE DRAWINGS

A complete understanding of the present invention may be obtained by reference to the accompanying drawings, when taken in conjunction with the detail description thereof and in which:

FIGS. 2b, 2c, and 2d are three different cross-sectional views of the control device of FIG. 2a;

FIG. 4 is a rear elevational view of an alternate embodiment of the control device of FIG. 2a;

FIGS. 5a and 5b are schematic block diagrams showing, respectively, hard-wired and wireless modes of operation of the control device of FIG. 2a;

FIG. 6c is a back side perspective view of the control device of FIG. 6a.

FIG. 7 is a front side perspective view of the control device of FIG. 2a.

DETAILED DESCRIPTION OF THE PREFERRED EMBODIMENT

Generally speaking this invention relates to a small, substantially symmetrical, hand-held control device adapted for interchangeable use in either the right or left hand of a user. The control device may be provided in a number of different configurations.

Figure 1:
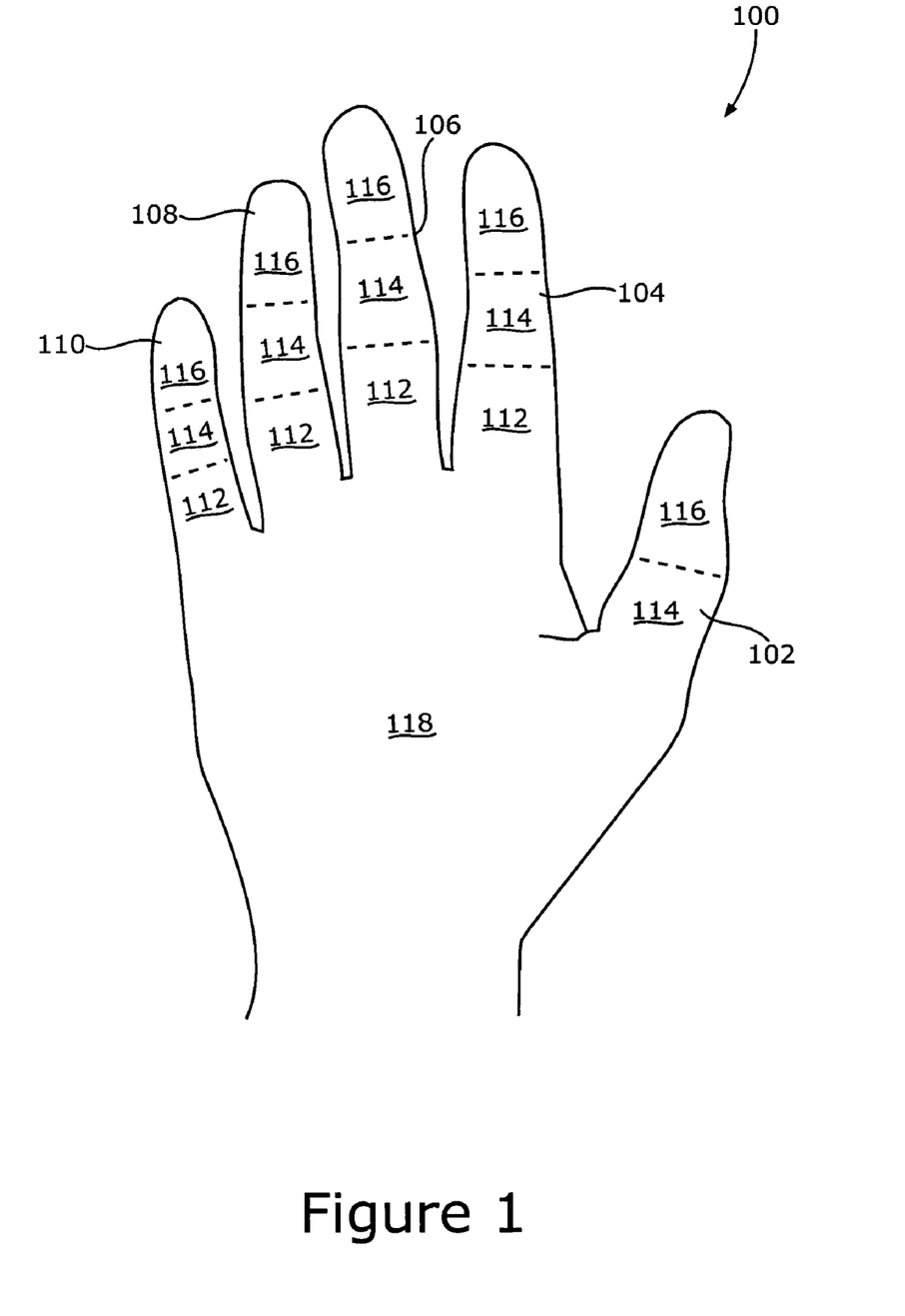
FIG. 1 is a schematic plan view of a palm-up human hand.

Referring first to FIG. 1, there is shown a top plan schematic view 100 of the front side of a human hand identifying the jointed segments of the fingers including thumb 102, index finger 104, middle finger 106, ring finger 108, and little finger 110. Each finger 104, 106, 108, 110 has three bones (i.e., phalanges) defining first, second, and third phalangeal regions 112, 114, and 116, respectively. As used herein, first phalangeal region refers to the phalange closest to and interconnected to a respective metacarpal bone of the hand while the third phalangeal region 116 is that region at the tip of the finger 104, 106, 108, 110, and thumb 102. Thumb 102 has only two phalanges thereby defining only phalangeal regions 114, 116 therein. Hand 100 has a palm region 118 which overlies the five metacarpal bines, not shown, of hand 100.

Figure 2A:
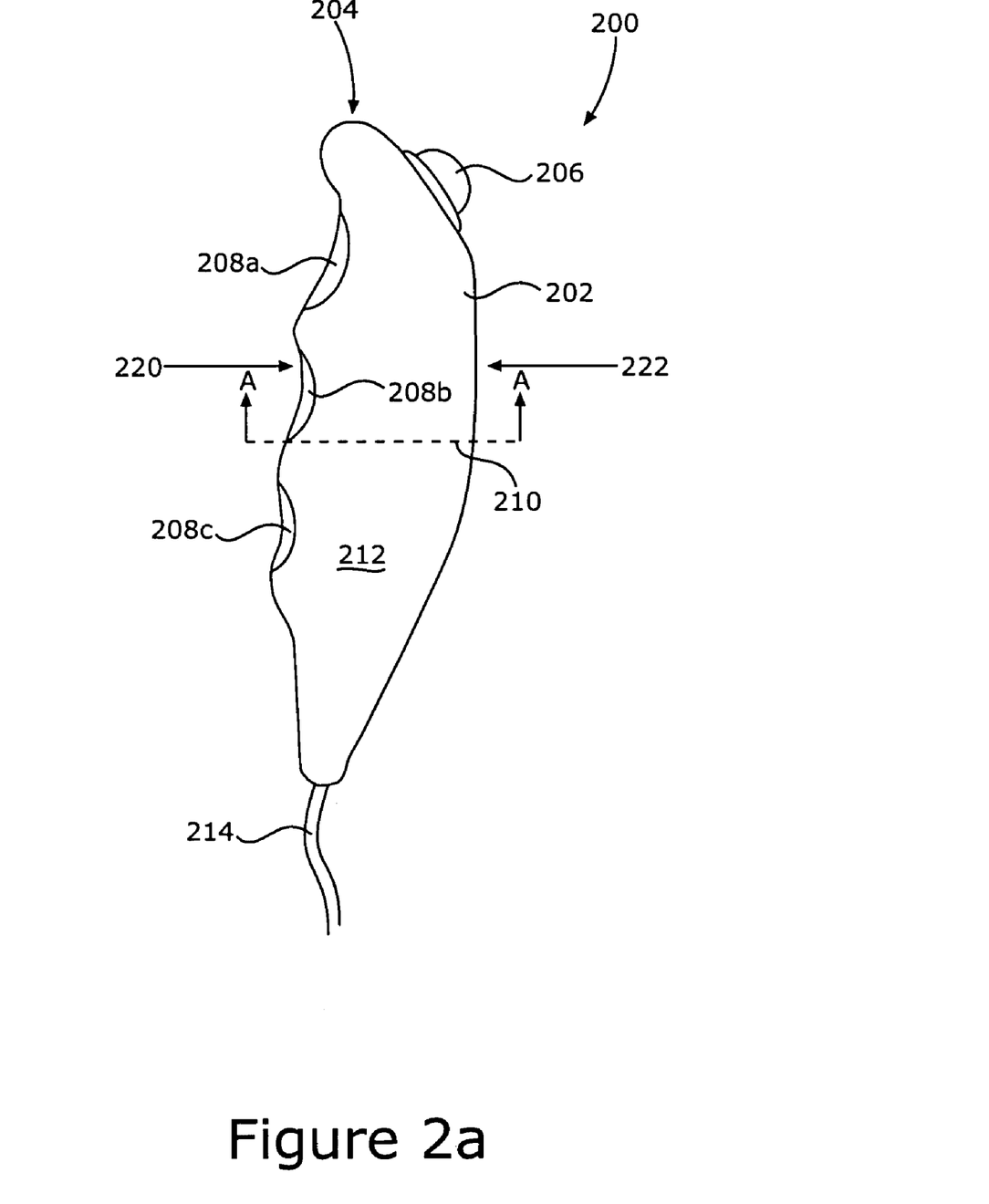
FIG. 2a is a side elevational view of a first embodiment of the control device of the invention.
Figure 3:
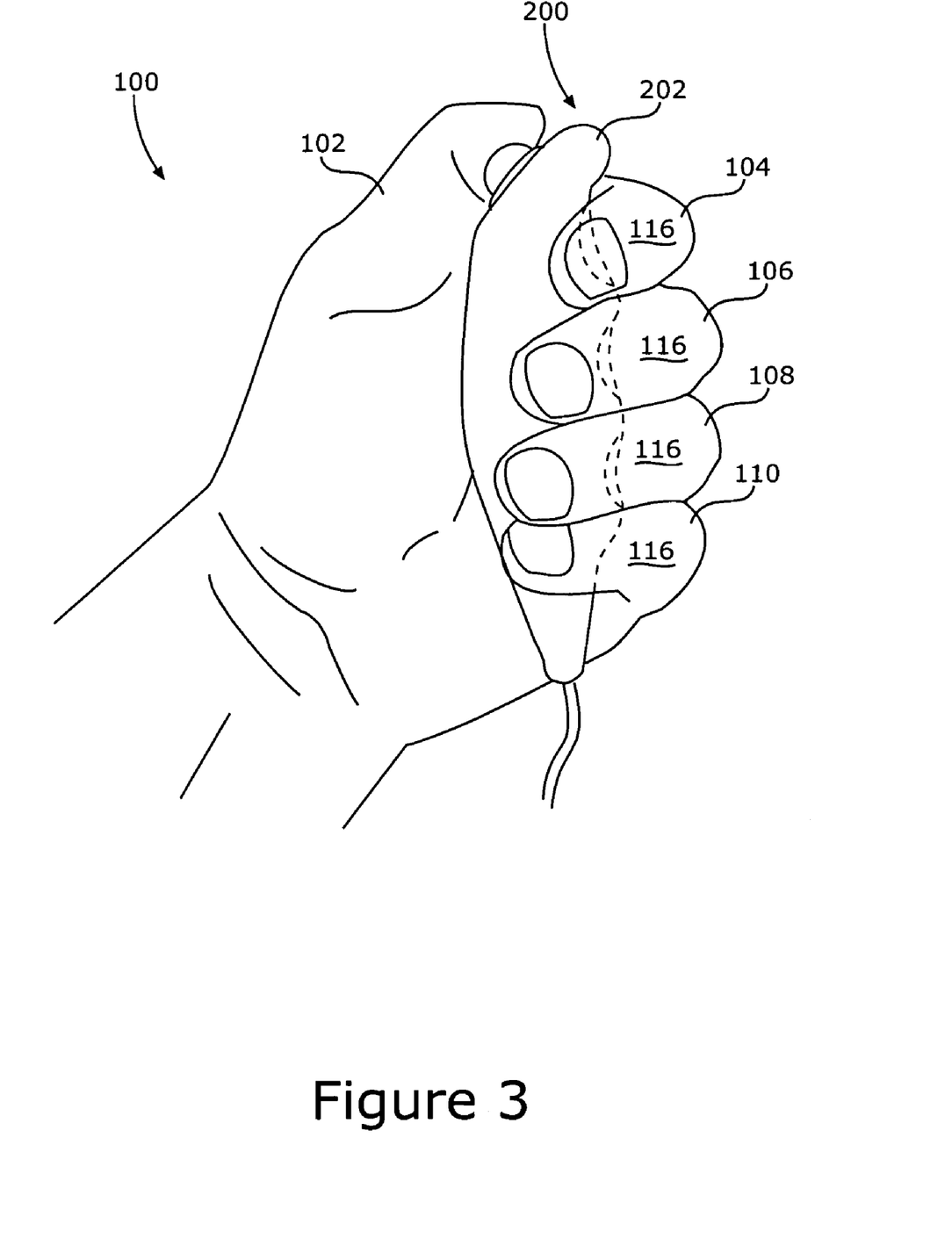
FIG. 3 is a palm-side perspective view of the hand-held control device of FIG. 2a with a user's hand closed around the control device.

Referring now also to FIGS. 2a and 3, there are shown side, elevational and an in situ, perspective view, respectively, of a first embodiment of the control device of the invention, generally at reference number 200 (FIG. 2a). Unlike any control devices of the prior art, control device 200 is designed for placement adjacent the palm region 118 of a hand 100 where it may readily be held in place by at least one finger 104, 106, 108, 110 encircling and thereby securing control device 200. Alternately, control device 200 may be captured and secured by applying pressure between thumb 102 and at least one other finger 104, 106, 108, 110 or palm region 118. Unlike any prior art pointing devices, the unique shape of housing 202 of control device 200 allows the encirclement thereof by only one finger 104, 106, 108, 110 to secure the control device 200 in an operable position. This unique shape and the position of control device 200 in the user's hand allows the user to utilize the tips of any or all fingers 104, 106, 108, 110 to perform tasks unrelated to the control device 200, for example, typing.

Control device 200 has a substantially symmetrical shape on its vertical axis and may, therefore, be interchangeably used in either the right hand, (mirror of FIG. 3), or the left hand, (FIG. 3), of a user.

Figure 2B:
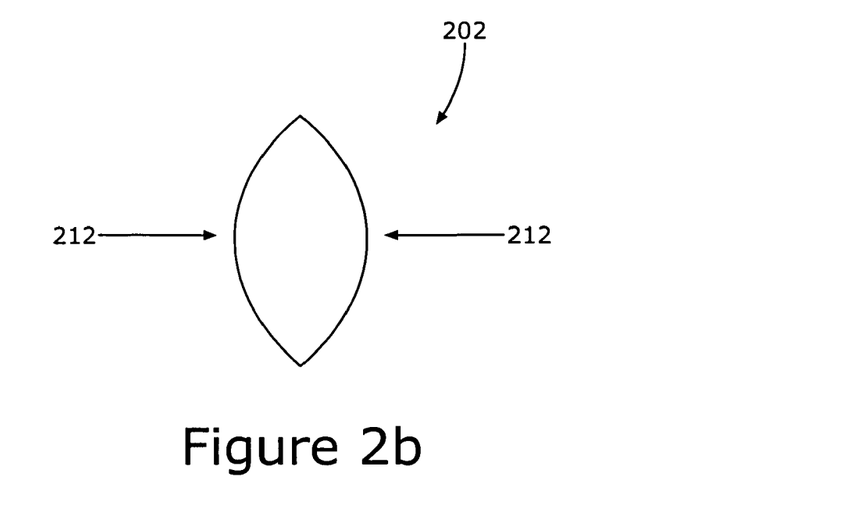
Figure 2C:
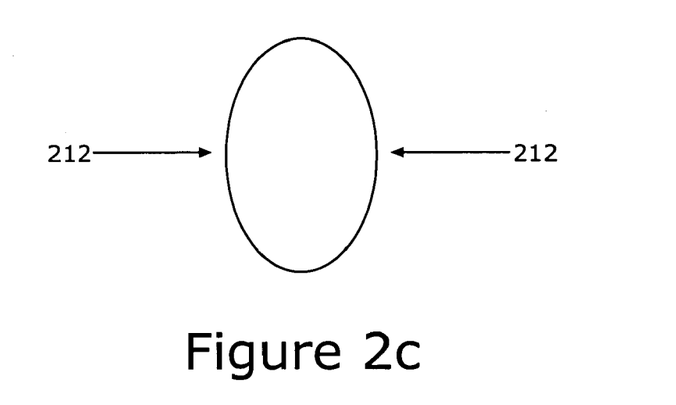
Figure 2D:
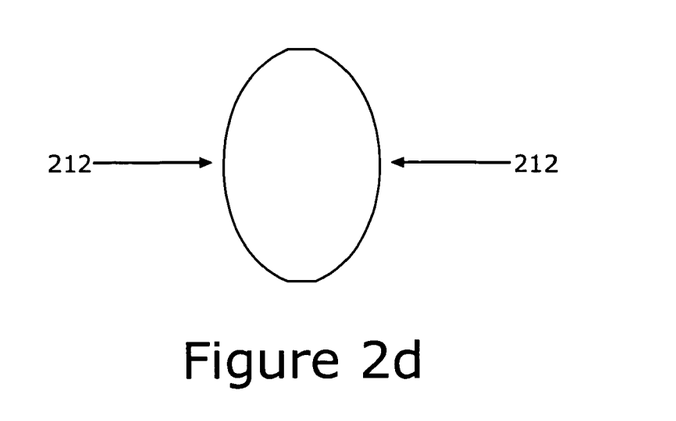

The shape of housing 202 of control device 200 may best be described as a shape conforming naturally, snuggly, and comfortably to a cavity created in a user's hand 100 by the natural and normal closing (i.e., curling the fingers of the hand so as to grip an object). Another way to describe the shape of housing 202 is an ergonomically contoured, "pistol grip", housing. Referring now also to FIGS. 2b, 2c and 2d, there are shown three examples of possible cross-sectional views of housing 202 taken along line 210 indicated by arrows A-A. It may readily be seen that the sides 212 of housing 202 are generally curvilinear. Many variations of the cross-sectional shape of housing 202 as exemplified in FIGS. 2b, 2c, and 2d are possible. While in the preferred embodiment of the control device 200 of the invention sides 212 are symmetrical and convex, it is possible to create alternate embodiments having asymmetrical sides, concave sides, or other more complex curvilinear shapes. The invention is not, therefore, considered limited to one of the specific shapes chosen for purposes of disclosure.

Housing 202 has an upper region 204 and a actuation device 206 (i.e., a trackball, joystick, touch pad, or other device adapted to translate the movement of thumb 102 into an electrical signal representative of the movement of thumb 102). Such activation devices are known to those of skill in the art and are not further described herein. Actuation device 206 is shown, for purposes of disclosure, as a track ball in FIGS. 2 and 3 but it will be recognized that other actuation devices, either known or yet to be invented, may readily be substituted therefore. As the actual actuation device forms no part of the instant invention, the invention is not considered limited to the particular activation devices chosen for purposes of disclosure but is seen to encompass any actuation device capable of translating either movement or position of a user's thumb 102 to an electrical signal.

Switches 208a, 208b, 208c and disposed on a front region (i.e., a region substantially diametrically opposed to the location of actuation device 206) of housing 202 and are adapted for actuation by a respective first, second, or third phalangeal region 112, 114, 116, respectively, of a respective one of fingers 104, 106, 108, 110. It will re recognized that control device 200 may have no switches 208 or that one, two, three, or more switches 208n may be present. However, for typical computer mouse applications, a minimum of two switches are assumed to be present. Therefore, the inventive concept is not limited to a particular number of switches 208n but rather includes embodiments having no switches to embodiments having one or more switches 208n.

Because of the unique shape of housing 202 and the variance of user's hands as well a personal preferences, housing 202 may occupy a wide variety of positions in a user's hand 100. Depending upon where a user positions housing 202 in his or her hand 100, switches 208a, 208b, 208c . . . 208n may be actuated by whichever of first, second or third phalangeal regions 112, 114, 116, respectively, which happen to fall over respective ones of switches 208a, 208b, 208c in a particular position of housing 202 in the user's hand 100. Regardless of which one of first, second, or third phalangeal regions 112, 114, 116 actually activate respective ones of switches 208a, 208b, 208c, activation is caused by the natural motion of fingers 104, 106, 108, 110 contracting from an extended position such as that shown in FIG. 1 to a closed position such as shown in FIG. 3. The term "natural motion" of the fingers 104, 106, 108, 110 as used herein may be thought of as a squeezing or contracting motion as the fingers move from an extended to an encircling position. It will be recognized that depending upon the exact placement of housing 202 in palm region 118 of hand 100, different ones of switches 208a, 208b, 208c may each be actuated by a different one of first, second, and third phalangeal regions 112, 114, 116 of corresponding ones of fingers 104, 106, 108, 110.

In the preferred embodiment, switches 208a, 208b, 208c are implemented as discrete switch devices enclosed in housing 202. It will be recognized that switches 208a, 208b, 208c could alternately be implemented as a single switch device, not shown, having multiple switch elements, not shown, included as a part thereof. Such a switch assembly could be mounted either within housing 202 or on an outside surface thereof and could include any practical number of switch elements. While in the preferred embodiment, switches 208a, 208b, 208c are typically momentary contact switches, other switch types, for example, toggled on-off switches could also be used as required to meet a particular operating circumstance or environment.

In other embodiments of control device 200, an actuation mechanism 206 may incorporate one or more switch functions. One or more of these switch functions may replace, parallel, or supplement one or more of the functions normally performed by switches 208a, 208b, 208c.

Figure 4:
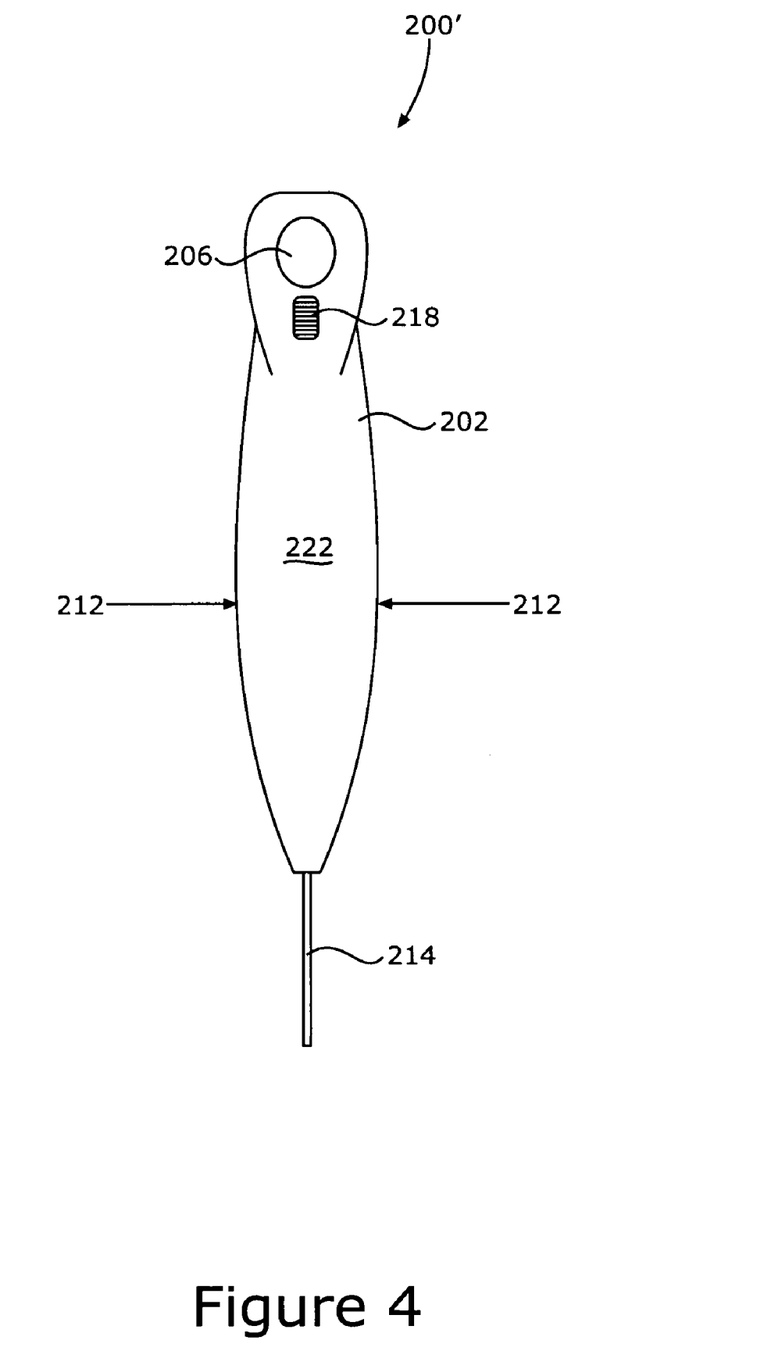

Referring now to FIG. 4, there is shown a rear elevational view of an alternate embodiment of control device 200, generally at 200'. Housing 202 has a scroll wheel 218 disposed in an upper region thereof adjacent actuating device 206. Scroll wheel 218 is representative of any device capable of controlling scrolling action in a manner consistent with a scroll wheel on a mouse, not shown, or any other pointing device of the prior art. Scroll wheel 218 may incorporate a switch, not shown, to replace, parallel, or supplement one of switches 208a, 208b, 208c, . . . 208n (FIG. 2a). In still other embodiments, the scroll wheel switch may be disposed to perform a function not necessarily associated with one of switches 208a, 208b, 208c. The inclusion of scroll wheel 218 or the like provides additional functionality to control device 200' FIG. 4 without limiting any of the functionality and ease of use of control device 200 (FIG. 2a). Scroll wheel 218 is intended to represent any scroll control device and the invention is not considered limited to the scroll wheel chosen for purposes of disclosure. Rather, the invention is seen to cover any functionally equivalent replacement.

As described hereinabove, actuation device 206 is typically manipulated by the user's thumb 102. Circuitry (not shown) within housing 202 is adapted to receive input signals from actuation device 206 and switches 208a, 208b, 208c . . . 208n and provide a standardized output signal compatible with the output signal of a standard mouse or other similar pointing device.

Communications between the circuitry and the computer or similar device to which control device 200 is providing signals may be by either a hard-wired connection or by a wireless interconnection. The preferred wireless interconnection is typically a radio frequency RF signal. However, infrared (IR) or other known wireless interconnection strategies could be substituted for an RF or IR link. Both types of electrical communications interfaces are well known in the art and form no part of the present invention. A "tail" 214 emerging from a lower distal point of housing 202 may be a hard wire cable leading to a remote computer (not shown), or, in alternate embodiments, may be an antenna for transmitting signals to a receiver. In the wireless embodiment of the control device, it will be recognized that power must be supplied for both the internal transmitter (not shown) and for the actuation device/switch interface circuitry as well. Power may be provided by a battery, not shown, which, of course, could be a disposable replacement battery, a removable rechargeable battery, or a rechargeable battery with a suitable connector, not shown, provided for applying recharging power to the internal, rechargeable battery. In hard wired embodiments, all necessary power may be supplied by the computer or other apparatus to which the control device 200 is attached.

Figure 5A:
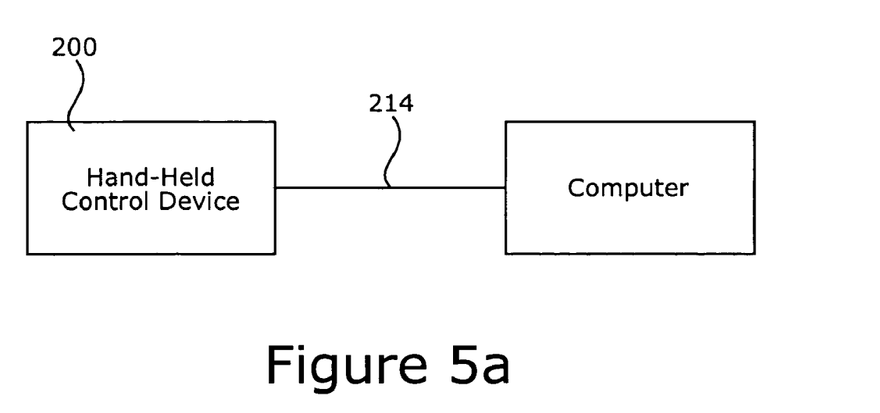
Figure 5B:
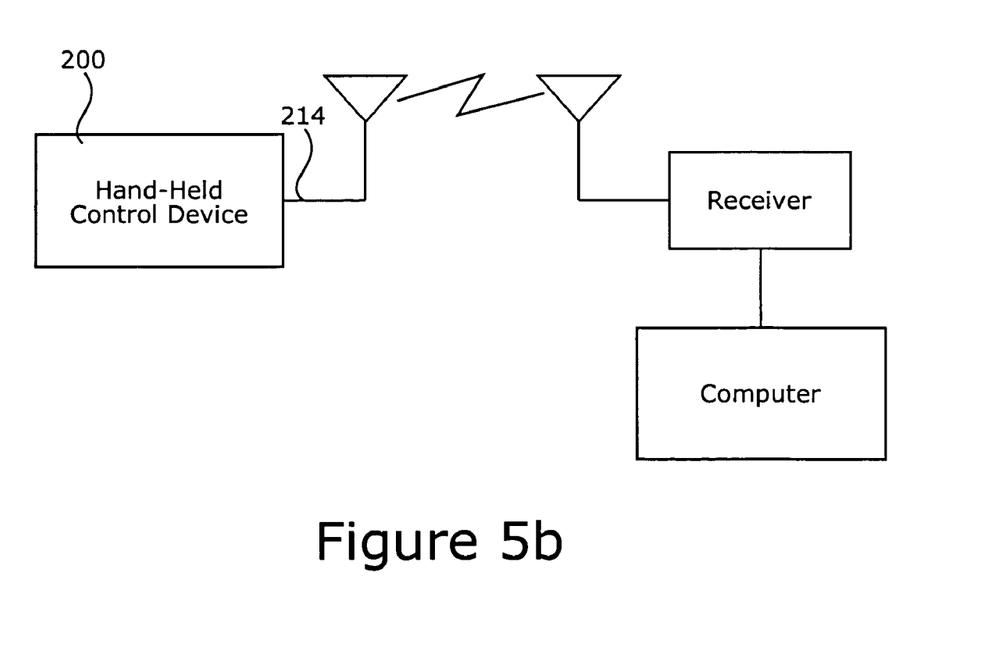

The two possible communications strategies are illustrated in FIGS. 5a and 5b, respectively. It will also be recognized that other wireless interconnection strategies are available and could be used instead of an RF communications. Infrared (IR) is one such alternate communications link. The advantage of a RF communications link over an IR link is that there is no need to maintain an unblocked line of sight to the receptor (i.e., antenna) such as is required when using an IR link.

In operation, the inventive control device 200 rests in a user's hand 100 with switches 208a, 208b, 208c positioned adjacent the index and subsequent fingers 104, 106, 108, 110. By positioning control device 200 in this way, relatively small movements of the fingers 104, 106, 108, 110 are required to activate their respective switches 208a, 208b, 208c. It will be noted that the tips of fingers 104, 106, 108, 110 remain relatively unencumbered if desired and, consequently, are available for other operations or functions in addition to actuating control device 200 switches 208a, 208b, 208c. In addition, housing 202 is sized and shaped so as to provide an ergonomically proper relationship between; actuating device 206 and the user's thumb 102; and the user's fingers 104, 106, 108, 110 and corresponding switches 208a, 208b, 208c as shown in FIG. 3.

Figure 6A:
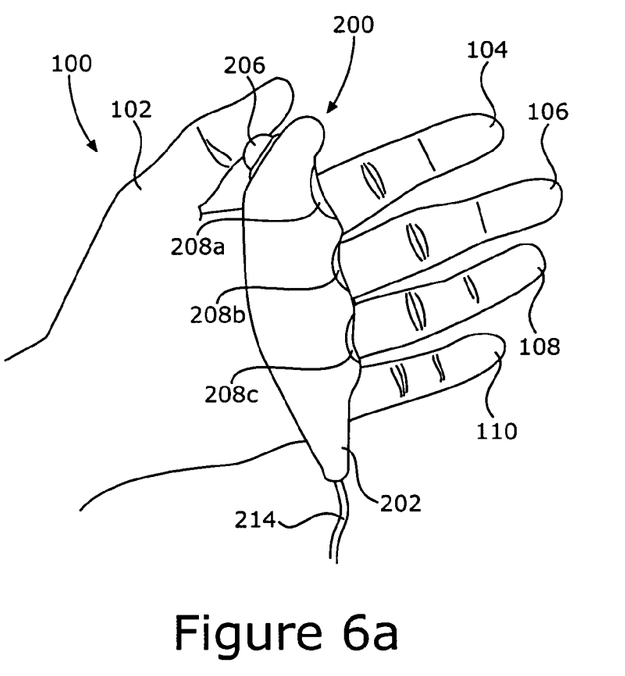
FIG. 6a is a palm-side perspective view of the control device of FIG. 2a in position in a user's open hand but unsecured.
Figure 6B:
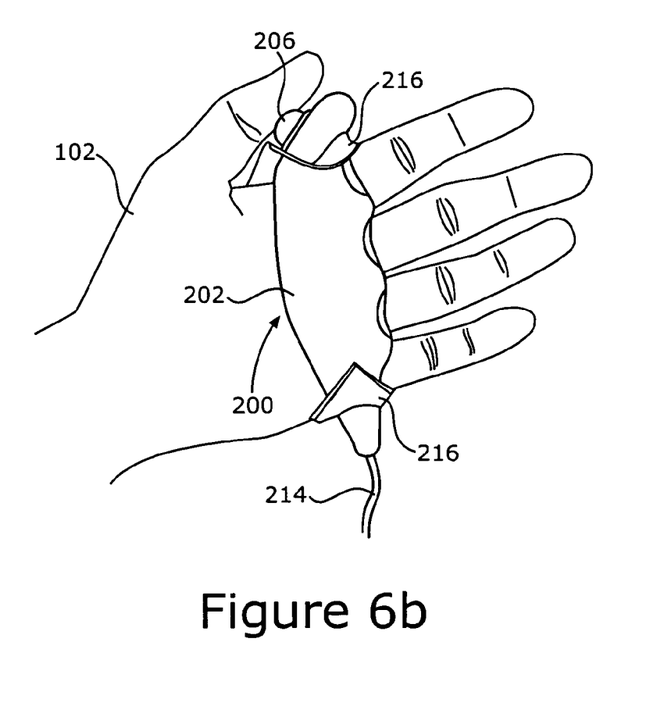
FIG. 6b is a palm-side perspective view of the control device of FIG. 2a in position in a user's open hand but secured by an elastic band.
Figure 6C:
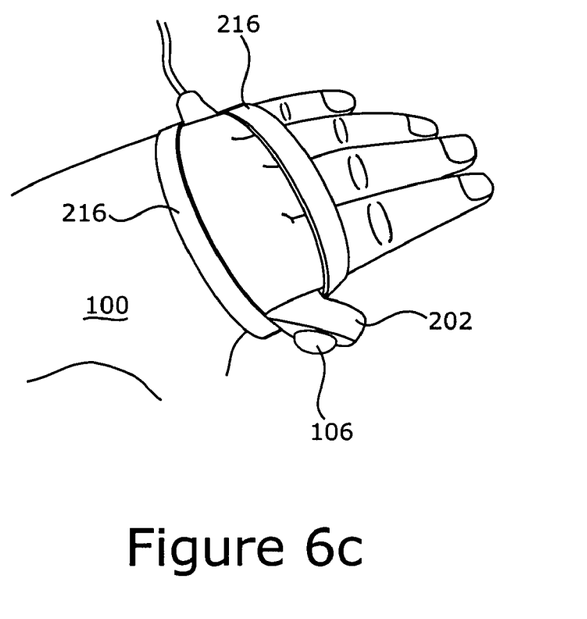

Referring now to FIGS. 6a, 6b, and 6c, there are shown perspective front open with control device 200 unsecured (FIG. 6a), perspective front open with control device 200 secured (FIG. 6b), back perspective views with control device 200 secured (FIG. 6c), respectively, of the control device 200 secured to the user's hand 100 using band 216. By securing control device 200 to a user's hand 100 using band 216 or any other suitable method, the user may utilize thumb 102 and fingers 104, 106, 108, 110 for other operations such as typing on the computer keyboard (not shown) or other similar tasks. Band 216 may be a continuous elastic band or bands. In alternate embodiments, straps having hook and loop fasteners (e.g., Velcro®) or other similar fasteners could also be used.

Figure 7:
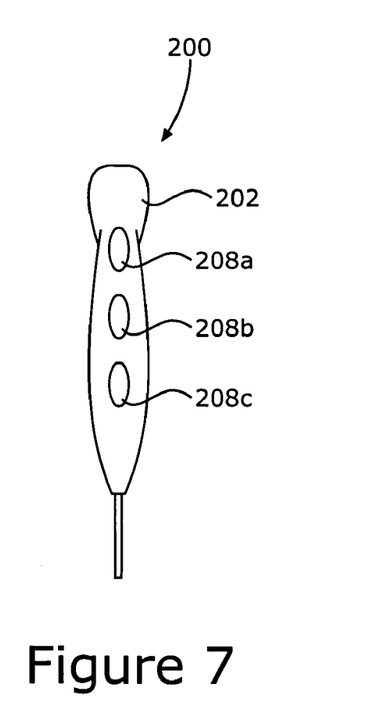

FIG. 7 shows a front view of the housing 202 with the three switches 208a, 208b and 208c. In alternate embodiments, switches could range from none to any number controllable by the users fingers and hand.

Since other modifications and changes varied to fit a particular operating requirements and environment will be apparent to those skilled in the art, the invention is not considered limited to the example chosen for purposes of disclosure, and covers all changes and modifications which do not constitute a departure from the true spirit and scope of the invention.

Having thus described the invention, what is desired to be protected by Letters Patent is presented in the subsequent appended claims.

What is claimed is:

1. A symmetrical, hand-held computer control device for interchangeable use in either a right hand or a left hand of a user, comprising:
    a) an elongated housing adapted and configured to fit snugly within a cavity created by the natural and normal closure of the fingers of a user's hand, said housing being formed fit interchangeably into a user's right or left hand; said housing being adapted for retention in said user's right or left hand between a phalangeal region of at least one finger of said user's right or left hand and a palm region thereof, thereby freeing portions of said fingers beyond said phalangeal regions for tasks unrelated to said control device;
    b) an actuating mechanism disposed in an upper region of said housing and adapted and configured for interaction with the thumb of said right or left hand of said user, and adapted for generating an actuation signal representative of at least one of a position, and a movement of said thumb;
    c) circuitry disposed within said housing and operatively connected to said actuating element and adapted to receive at least said actuating signal and to generate an output signal representative of at least said actuating signal; and
    d) means for communicating operatively connected to said circuitry and adapted to communicate said output signal to an external device.

2. The symmetrical, hand-held computer control device for interchangeable use in either a right hand or a left hand of a user as recited in claim 1, wherein said actuation device comprises at least one of the devices: a trackball, a joy stick, a touch pad, a switch, and another actuating device.

3. The symmetrical, hand-held computer control device for interchangeable use in either a right hand or a left hand of a user as recited in claim 2, further comprising
    e) at least one switch disposed in said housing and adapted for manipulative interaction with said a metacarpal region of a finger of said right or left hand of said user, said at least one switch producing a switch signal representative of the state of said at least one switch, and wherein said circuitry further comprises means for receiving said switch signal and generating an output signal representative of at least said actuation signal and said switch signal.

4. The symmetrical, hand-held computer control device for interchangeable use in either a right hand or a left hand of a user as recited in claim 3, wherein said at least one switch is adapted and configured for switchable interaction with a phalangeal region of a finger of said user's right or left hand.

5. The symmetrical, hand-held computer control device for interchangeable use in either a right hand or a left hand of a user as recited in claim 3, wherein said at least one switch comprises one of the switch configurations: one switch, two switches, three switches, four switches, and more than four switches, adapted and configured for switchable interaction with a phalangeal region of a finger of said right or left hand of said user.

6. The symmetrical, hand-held computer control device for interchangeable use in either a right hand or a left hand of a user as recited in claim 3, wherein said at least one switch comprise at least one discrete switch element.

7. The symmetrical, hand-held computer control device for interchangeable use in either a right hand or a left hand of a user as recited in claim 3, wherein said at least one switch comprise a switch assembly comprising at least two discrete switch elements.

8. The symmetrical, hand-held computer control device for interchangeable use in either a right hand or a left hand of a user as recited in claim 2, wherein said means for communicating comprises one of the connection methods: a hard-wired connection, and a wireless connection to said external device.

9. The symmetrical, hand-held computer control device for interchangeable use in either a right hand or a left hand of a user as recited in claim 2, further comprising:
    f) a wireless transmitter comprising at least one of: a radio frequency (RF) transmitter, and an infrared transmitter, either adapted to transmit said output signal.

10. The symmetrical, hand-held computer control device for interchangeable use in either a right hand or a left hand of a user as recited in claim 2, further comprising:
    f) optional means for securing said hand-held computer control device to said right or left hand of said user.

11. The symmetrical, hand-held computer control device for interchangeable use in either a right hand or a left hand of a user as recited in claim 10, wherein said optional means for securing said hand-help control device comprises at least one of the devices: an elastic band, and a strap having hook and loop fasteners.

12. The symmetrical, hand-held computer control device for interchangeable use in either a right hand or a left hand of a user as recited in claim 2, further comprising:
    e) a scrolling mechanism disposed proximate an upper region of said housing and adapted for interaction with a thumb of a user's right or left hand and generating a scrolling signal representative of a position thereof, and wherein said circuitry further comprises means for receiving said scrolling signal and generating an output signal representative of at least said actuation signal and said scrolling signal.

13. The symmetrical, hand-held computer control device for interchangeable use in either a right hand or a left hand of a user as recited in claim 12, wherein said scrolling mechanism comprises a scroll wheel.

14. The symmetrical, hand-held computer control device for interchangeable use in either a right hand or a left hand of a user as recited in claim 13, wherein scroll wheel comprises a switch.

15. The symmetrical, hand-held computer control device for interchangeable use in either a right hand or a left hand of a user as recited in claim 12, further comprising:
    f) at least one switch disposed in said housing and adapted for manipulative interaction with said a metacarpal region of a finger of said right or left hand of said user, said at least one switch producing a switch signal representative of the state of said at least one switch, and wherein said circuitry further comprises means for receiving said switch signal and generating an output signal representative of at least said actuation signal, said scrolling signal and said switch signal.

16. The symmetrical, hand-held computer control device for interchangeable use in either a right hand or a left hand of a user as recited in claim 15, wherein said at least one switch is adapted and configured for switchable interaction with a phalangeal region of a finger of said user's right or left hand.

17. The symmetrical, hand-held computer control device for interchangeable use in either a right hand or a left hand of a user as recited in claim 15, wherein said at least one switch comprises three switches one of the switch configurations: one switch, two switches, three switches, four switches, and more than four switches, adapted and configured for switchable interaction with a phalangeal region of a finger of said right or left hand of said user.

18. The symmetrical, hand-held computer control device for interchangeable use in either a right hand or a left hand of a user as recited in claim 15, wherein said at least one switch comprise at least one discrete switch element.

19. The symmetrical, hand-held computer control device for interchangeable use in either a right hand or a left hand of a user as recited in claim 15, wherein said at least one switch comprises a switch assembly comprising at least two discrete switch elements.

* * * * *